US008645596B2

(12) United States Patent
Kumar et al.

(10) Patent No.: US 8,645,596 B2
(45) Date of Patent: *Feb. 4, 2014

(54) INTERRUPT TECHNIQUES

(75) Inventors: Amit Kumar, Hillsboro, OR (US); Steven King, Portland, OR (US); Ram Huggahalli, Phoenix, AZ (US); Xia Zhu, Hillsboro, OR (US); Mazhar Memon, Austin, TX (US); Frank Berry, North Plains, OR (US); Nitin Bhardwaj, Hillsboro, OR (US); Theodore Willke, II, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/319,033

(22) Filed: Dec. 30, 2008

(65) Prior Publication Data

US 2010/0169528 A1 Jul. 1, 2010

(51) Int. Cl.
*G06F 3/00* (2006.01)
(52) U.S. Cl.
USPC .......................................... 710/52; 710/263
(58) Field of Classification Search
USPC ............................................................. 710/52
See application file for complete search history.

(56) References Cited

U.S. PATENT DOCUMENTS

| | | | |
|---|---|---|---|
| 4,365,294 A | 12/1982 | Stokken | |
| 4,374,410 A * | 2/1983 | Sakai et al. | 711/206 |
| 5,758,169 A | 5/1998 | Nizar et al. | |
| 5,982,783 A * | 11/1999 | Frey et al. | 370/395.6 |
| 6,044,415 A | 3/2000 | Futral et al. | |
| 6,070,188 A | 5/2000 | Grant et al. | |
| 6,148,361 A | 11/2000 | Carpenter et al. | |
| 6,219,728 B1 | 4/2001 | Yin | |
| 6,332,180 B1 | 12/2001 | Kauffman et al. | |
| 6,467,007 B1 | 10/2002 | Armstrong et al. | |
| 6,490,280 B1 | 12/2002 | Leung | |
| 6,789,156 B1 | 9/2004 | Waldspurger | |
| 7,162,666 B2 | 1/2007 | Bono | |
| 7,212,528 B2 | 5/2007 | Kuhl et al | |
| 7,219,121 B2 | 5/2007 | Kaniyar et al. | |
| 7,254,112 B2 | 8/2007 | Cornet et al. | |
| 7,409,589 B2 | 8/2008 | Mack et al. | |

(Continued)

FOREIGN PATENT DOCUMENTS

| CN | 1578263 A | 2/2005 |
|---|---|---|
| CN | 101004728 A | 7/2007 |

(Continued)

OTHER PUBLICATIONS

Romanow, Allyn et al., "An Overview of RDMA over IP", In First International Workshop on Protocols for Fast Long-Distance Networks, 2003, pp. 1-22.

(Continued)

*Primary Examiner* — Henry Tsai
*Assistant Examiner* — John Roche
(74) *Attorney, Agent, or Firm* — Glen B Choi

(57) ABSTRACT

Techniques are described that can be used by a message engine to notify a core or hardware thread of activity. For example, an inter-processor interrupt can be used to notify the core or hardware thread. The message engine may generate notifications in response to one or more message received from a transmitting message engine. Message engines may communicate without sharing memory space.

25 Claims, 13 Drawing Sheets

(56) References Cited

U.S. PATENT DOCUMENTS

| | | | |
|---|---|---|---|
| 7,437,511 B1 | 10/2008 | Nguyen et al. | |
| 7,490,324 B2 | 2/2009 | Shultz et al. | |
| 7,525,967 B2 | 4/2009 | Vasudevan et al. | |
| 7,548,513 B2 | 6/2009 | Tran | |
| 7,584,286 B2 | 9/2009 | Goglin et al. | |
| 7,620,955 B1 | 11/2009 | Nelson | |
| 7,724,740 B1 | 5/2010 | Wang et al. | |
| 7,746,223 B2 | 6/2010 | Howarter et al. | |
| 7,765,405 B2 | 7/2010 | Pinkerton et al. | |
| 8,307,105 B2* | 11/2012 | King et al. | 709/230 |
| 2004/0034773 A1* | 2/2004 | Balabine et al. | 713/168 |
| 2004/0042395 A1 | 3/2004 | Lu et al. | |
| 2004/0081202 A1* | 4/2004 | Minami et al. | 370/469 |
| 2004/0107416 A1 | 6/2004 | Buban et al. | |
| 2004/0128549 A1* | 7/2004 | Poisner | 713/201 |
| 2004/0205272 A1* | 10/2004 | Armstrong et al. | 710/260 |
| 2004/0267948 A1 | 12/2004 | Oliver et al. | |
| 2005/0027914 A1 | 2/2005 | Hammalund et al. | |
| 2005/0066115 A1* | 3/2005 | Simha et al. | 711/108 |
| 2005/0089033 A1* | 4/2005 | Gupta et al. | 370/389 |
| 2005/0132210 A1 | 6/2005 | Yunus et al. | |
| 2005/0238019 A1 | 10/2005 | Vasudevan et al. | |
| 2006/0007855 A1 | 1/2006 | Tran et al. | |
| 2006/0168281 A1 | 7/2006 | Starr et al. | |
| 2006/0182031 A1 | 8/2006 | Tran | |
| 2006/0195698 A1 | 8/2006 | Pinkerton et al. | |
| 2006/0227788 A1 | 10/2006 | Eldar et al. | |
| 2006/0236011 A1 | 10/2006 | Narad et al. | |
| 2006/0242352 A1* | 10/2006 | Torudbakken et al. | 710/312 |
| 2007/0168525 A1 | 7/2007 | DeLeon, III et al. | |
| 2007/0168580 A1 | 7/2007 | Schumacher | |
| 2008/0002724 A1 | 1/2008 | Grewal et al. | |
| 2008/0059686 A1 | 3/2008 | Wilkinson | |
| 2008/0080491 A1 | 4/2008 | Saripalli | |
| 2009/0006521 A1 | 1/2009 | Veal et al. | |
| 2009/0086736 A1 | 4/2009 | Foong et al. | |
| 2009/0097495 A1 | 4/2009 | Palacharla et al. | |
| 2009/0213732 A1 | 8/2009 | Veal et al. | |
| 2009/0300629 A1* | 12/2009 | Navon et al. | 718/102 |
| 2010/0017583 A1 | 1/2010 | Kuiper et al. | |
| 2010/0070677 A1 | 3/2010 | Thakkar | |
| 2010/0131636 A1 | 5/2010 | Suri et al. | |
| 2010/0169501 A1 | 7/2010 | King et al. | |
| 2010/0169528 A1 | 7/2010 | Kumar et al. | |
| 2010/0262743 A1 | 10/2010 | Zimmer et al. | |

FOREIGN PATENT DOCUMENTS

| | | |
|---|---|---|
| JP | H07-177164 A | 7/1995 |
| JP | 11-249978 A | 9/1999 |
| JP | 2002-305535 A | 10/2002 |
| JP | 2004-531001 A | 10/2004 |
| JP | 2006-516054 A | 6/2006 |
| WO | 2008/045809 A2 | 4/2008 |
| WO | 2008/045809 A3 | 6/2008 |
| WO | 2010/078010 A2 | 7/2010 |
| WO | 2010/078017 A2 | 7/2010 |
| WO | 2010/078017 A3 | 8/2010 |
| WO | 2010/078010 A3 | 9/2010 |

OTHER PUBLICATIONS

Shah, Hemal et al., "Direct Data Placement over Reliable Transports (Version 1.0)", draft-shah-iwarp-ddp-v1.0, Oct. 21, 2002, pp. 1-35.

International Search Report and Written Opinion for PCT Patent Application No. PCT/US2009/068425, mailed on Jun. 29, 2010, 11 pages.

Bush, Stephen F., "Active Virtual Network Management Protocol", General Electric Corporate Research and Development, Niskayuna, NY, 1999, 11 Pages.

Mattern, Friedemann, "Efficient Algorithms for Distributed Snapshots and Global Virtual Time Approximation", Journal of Parallel and Distributed Computing, 1993, vol. 18, No. 4, Germany, pp. 1-20.

International Search Report and Written Opinion for PCT Patent Application No. PCT/US2009/068396, mailed on Jul. 28, 2010, 9 Pages.

Office Action received for U.S. Appl. No. 12/319,099, mailed on Oct. 4, 2010, 28 Pages of Office Action.

Bush, Stephen F., "Active Virtual Network Management Prediction", In Parallel and Discrete Event Simulation Conference (PADS) 1999, 13 Pages.

office Action Received for Chinese Patent Application No. 200610172499.X, issued on Jan. 22, 2010, 7 Pages Chinese Office Action including 3 pages of English Translation.

International Preliminary Report on Patentability received for PCT Patent Application No. PCT/US2007/080633, mailed on Apr. 16, 2009, 7 pages.

International Search Report and Written Opinion received for PCT Patent Application No. PCT/US2007/080633, mailed on Mar. 31, 2008, 10 pages.

Foong et al., "An Architecture for Software-Based iSCSI: Experiences and Analyses", Lecture Notes in Computer Science: Networking 2005, vol. 3462/2005, pp. 1-12.

Muir et al., "AsyMOS—An Asymmetric Muitiprocessor Operating System", In Proceedings of OPENARCH '98, Apr. 1998, pp. 1-10.

Shafer et al., "A Gigabit Reconfigurable Programmable Network Interface Card", Department of Electrical and Computer Engineering, Rice University, 2005, pp. 1-14.

Cramer, "[RFC] Asynchronous IPI and e1000 Multiple Queues", Sep. 23, 2005, 2 pages, Available at: https://Ikml.org/Ikml/2005/9/23/204.

"M3F2-PCIXE-2, M3F2-PCIXE-4 ("E card")", Two-Port Myrinet-Fiber/PCI-X Network Interface Card (NIC),Myricorn, Dec. 28, 2005, 2 pages.

Veal et al., "Performance Scalability of a Multi-Core Web Server", Proceedings of the 3rd ACM/IEEE Symposium on Architecture for networking and communications systems, Dec. 3-4, 2007, pp. 57-66.

Intel, "Improving Network Performance in Multi-Core Systems", White Paper, Intel Ethernet Controllers, 2007, 4 pages.

Gupta et al., "Boosting Data Transfer with TCP Offload Engine Technology on Ninth-Generation Dell PowerEdge Servers", Dell Power Solutions, Aug. 2006, pp. 18-22.

Office Action Received for Chinese Patent Application No. 200610172499.X, mailed on Jan. 27, 2011, 6 pages of English Translation and 4 pages of Office Action.

Office Action received for U.S. Appl. No. 11/539,510, mailed on Feb. 25, 2011, 25 pages.

Office Action received for U.S. Appl. No. 11/539,510, mailed on Sep. 8, 2010, 21 pages.

Office Action received for U.S. Appl. No. 11/539,510, mailed on Mar. 26, 2010, 24 pages.

"IBM System x Advanced Networking Features", May 2006, 12 pages.

International Preliminary Report on Patentability received for PCT Patent Application No. PCT/US2009/068425, mailed on Jul. 14, 2011, 6 pages.

Office Action received for U.S. Appl. No. 13/173,459, mailed on Sep. 23, 2011, 10 pages.

International Preliminary Report on Patentability received for PCT Patent Application No. PCT/US2009/068396, mailed on Jul. 14, 2011, 5 pages.

Office Action Received for Japanese Patent Application No. 2011-543585, mailed on Nov. 27, 2012, 2 pages of English Translation and 2 pages of Office Action.

Office Action Received for Korean Patent Application No. 10-2011-7017993, mailed on Jan. 23, 2013, 3 pages of English Translation and 4 pages of Office Action.

Office Action received for U.S. Appl. No. 13/662,989, mailed on Mar. 5, 2013, 24 pages.

Office Action Received for Japanese Patent Application No. 2011-543585, mailed on Mar. 26, 2013, 1 page of English Translation and 1 page of Office Action.

(56) References Cited

OTHER PUBLICATIONS

Office Action Received for Chinese Patent Application No. 200610172499.X, mailed on Mar. 5, 2013, 5 pages of English Translation and 3 pages of Office Action.
Office Action Received for Chinese Patent Application No. 200610172499.X, mailed on Mar. 9, 2012, 5 pages of English Translation and 3 pages of Office Action.
Office Action Received for Chinese Patent Application No. 200610172499.X, mailed on Nov. 5, 2012, 13 pages of English Translation and 6 pages of Office Action.
Office Action Received for Taiwanese Patent Application No. 096137538, mailed on Dec. 26, 2011, 4 pages of English Translation and 8 pages of Office Action.
Office Action Received for Chinese Patent Application No. 200980155570.5 mailed on Sep. 24, 2013, 18 pages of English Translation and 14 pages of Office Action.

* cited by examiner

INTERRUPT TECHNIQUES

CROSS-REFERENCE TO RELATED APPLICATION

The present application is related to U.S. patent application Ser. No. 12/319,099, filed Dec. 30, 2008, entitled "Message Communication Techniques", now U.S. Pat. No. 7,996,548.

FIELD

The subject matter disclosed herein relates generally to techniques for interrupting a processor.

RELATED ART

In some cases, central processing units (CPUs) are used to process incoming network traffic. Accordingly, CPUs are required to process incoming traffic with low latency and real-time deadline guarantees. Polling input/output (I/O) and interrupt I/O are two major forms of interaction between a CPU and an I/O device. Polling I/O involves the CPU continuously querying the status of the I/O device while not doing any other work. Interrupt I/O involves use of interrupts to request CPU to respond to activity. It is desirable to develop techniques to request CPUs to perform tasks.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Interrupts can be made by a message engine to one or more cores in response to a variety of circumstances. In some embodiments, a message engine associated with one or more cores interrupts the one or more cores using an inter-processor interrupt, MSI or MSI-x interrupt messages, or via a dedicated hardwired interrupt line. For example, interrupts can be made when received network traffic is available for processing. As another example, interrupts can be made in the event of a page fault in which a core or hardware thread is to respond to the page fault.

Figure 1:
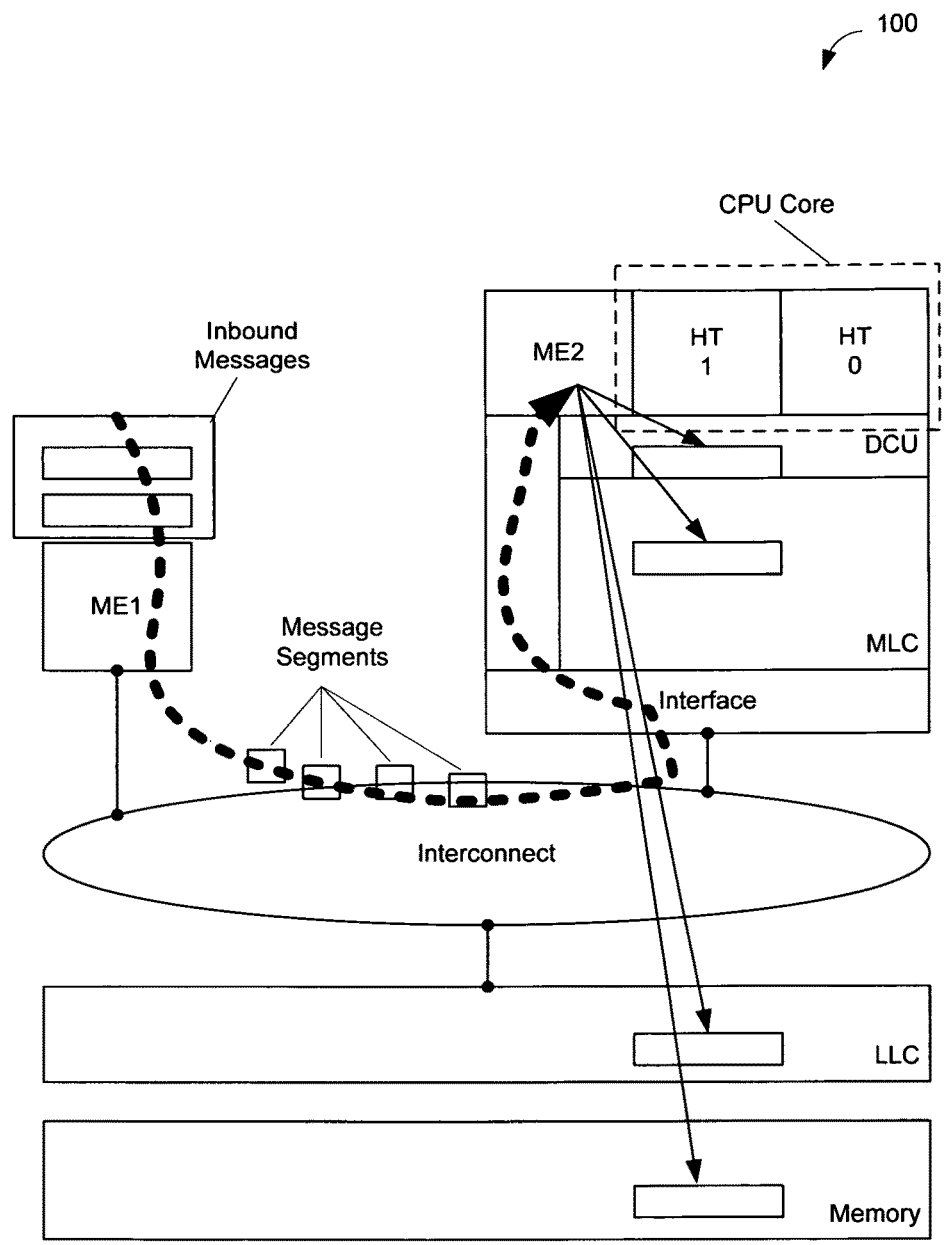
FIG. 1 depicts a system in accordance with an embodiment.

FIG. 1 depicts a high level overview of a system that uses Message Engines (ME) in accordance with an embodiment. Other more detailed aspects of message engine capabilities are described with regard to other figures. In this example, a first message engine, ME1, is capable of transmitting messages to a second message engine ME2 using an interconnect and without ME1 and ME2 using the same memory space. In some embodiments, a "message" encapsulates any type of data, but may not contain memory addresses for source memory buffers of the data and may not identify destination memory addresses for the data. In one embodiment, ME1 may have knowledge of a virtual message engine address (VMEA) of ME2 but not know the destination memory address of a memory buffer used by ME2 to store data transmitted by ME1. In addition, ME2 may know the VMEA of ME1, but not know a memory address from which data is transmitted using ME1. As will be described later, a VMEA may identify a particular message engine. A VMEA may be distinct from a memory address.

A benefit of not sharing memory space is that memory isolation for different applications can be maintained. A benefit of memory isolation is that failure or corruption of a memory space only affects the application that uses that memory space and no other applications. Another benefit of memory isolation is elimination of hardware and software overhead used to permanently or temporarily create shared memory between the memory spaces, or to transfer ownership of pages of memory between the memory spaces, or to transition to higher software privilege levels needed to copy data directly between the memory spaces.

In an embodiment, message engines may not maintain coherency of memory. Coherency is a protocol that ensures that multiple accessors of memory read the same data using the same address. Accordingly, by not maintaining coherency of memory, different message engines do not incur the overhead of the coherency protocol. Individual message engines may operate in distinct coherency domains. Coherency may be maintained at each endpoint. For example, coherency may be maintained between a thread and a message engine.

In an embodiment, message engines do not share the same physical memory. For example, message engines may not be permitted to access the same RAM chip.

A Virtual Message Engine (VME) is an instance of a virtualized interface to a Host Physical Message Engine (HPME). A VME supports sending and receiving of messages from virtual memory. Message Engines may also support RDMA Write and RDMA Read operations. A VME is either a Virtual Message Transmit Engine (VMTE) or Virtual Message Receive Engine (VMRE). A hypervisor or other privileged system entity (e.g., kernels in a native OS) may schedule one VMTE at a time, but multiple VMREs simultaneously on a single HPME. The hypervisor or other privileged entity may be a software routine executed by a processor.

Two virtual machines may make forward progress in their communication so long as a VMRE is able to receive when a VMTE transmits. The hypervisor may schedule the VMTE in a fine grain manner, such as by co-scheduling it with an associated software thread. The VMTE may discontinue transmitting when not scheduled by the hypervisor. The HPME may support multiple VMREs simultaneously. The VMRE may be scheduled independently from the CPU threads associated with a VMTE or a VMRE. The persistence of the VMRE may help with forward progress across scheduling quanta.

In some embodiments, a VMRE or VMTE may use processor virtual addresses for receiving and sending messages. These virtual addresses may use the same memory translation mechanism as software threads. The use of virtual addresses for messaging assists with address space isolation without the overhead of a separate memory control mechanism redundant to the existing software memory translation mechanism.

The hypervisor may build descriptors for VMEs (e.g., VMREs and VMTEs) with virtual addresses native to the address space in which the VME logically exists. A VME may logically exist in any virtual address space, for example: kernel mode of a native operating system (OS), kernel mode of a para-virtual non-VT guest OS, kernel mode of a fully virtual guest OS, user mode of a native OS, user mode of a para-virtual non-VT guest OS, user mode of a fully virtual guest OS, or a hypervisor. Virtual Message Engine Addresses (VMEA) may identify the VMTE or VMRE associated with a message.

In the example of FIG. 1, ME1 represents a Host Physical Message Engine (HPME). ME1 may be physically and logically associated with a source or sink of data, such as a computational element or input/output (IO or I/O) device (e.g., a network interface). ME1 may be incorporated into an IO device. A Virtual Message Transmit Engine (VMTE) associated with ME1 may use the VMEA of the destination VMRE to send messages to the destination VMRE. Accordingly, on transmit, ME1 maps a VMEA to an appropriate link over which segments flow and the segments arrive at the correct VMRE.

In this example, ME2 also represents an HPME. To receive segments, the ME2 uses a VMEA to locate the VMRE of the incoming message segments from the set of all VMREs scheduled at ME2. ME2 is capable of receiving messages for processing by multiple hardware threads, HT0 and HT1. ME2 may be incorporated into a core with one or more hyperthreads. In this example, hyperthreads HT0 and HT1 are two hyperthreads that can process received messages. ME2 may be located outside the core or may be associated with more than one core. Message engines may exist outside of the CPU socket, for example in discrete IO devices, so long as the intervening physical and link-layer interconnect can transport messages appropriately.

ME2 may place received messages into various levels of the cache hierarchy or memory. For example, received messages can be stored in any of a data cache unit (DCU), mid level cache (MLC), last level cache (LLC) shared by all cores, or main memory (e.g., DRAM or SRAM). The DCU may be the fastest cache nearest to a software pipeline.

ME2 may be virtualized. As with a software thread, a Message Engine for a core may interact with system software via virtual addresses as defined by traditional memory management unit (MMU) page tables. Message engines may share virtual address space with one or more threads, though system software could construct a dedicated set of page tables for a message engine.

A Message Engine may subdivide a message into one or more message segments suitable for transport over a message interconnect. Message segments may have no associated memory address, may be un-ordered with respect to memory transactions, and travel out-of-band with respect to the cache hierarchy. An application or other software that is to process the received message segments may specify destination memory addresses in which the receiving message engine may store the message segments.

The interconnect may provide a transport medium for message segments from a sending message engine to a receiving message engine. The interconnect may share physical resources with a coherent memory interconnect, but provides a transport that is logically distinct and out-of-band with respect to coherent memory. Example interconnects include a ring, crossbar, and/or mesh. Interconnects may also include external buses such as PCI express.

Although not depicted, the system of FIG. 1 may also include the capability to access a storage device using a storage adapter. For example, the storage adapter may be capable of communicating with the storage in conformance with any of the following protocols: Small Computer Systems Interface (SCSI), Fibre Channel (FC), and/or Serial Advanced Technology Attachment (S-ATA). The storage may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Figure 2:
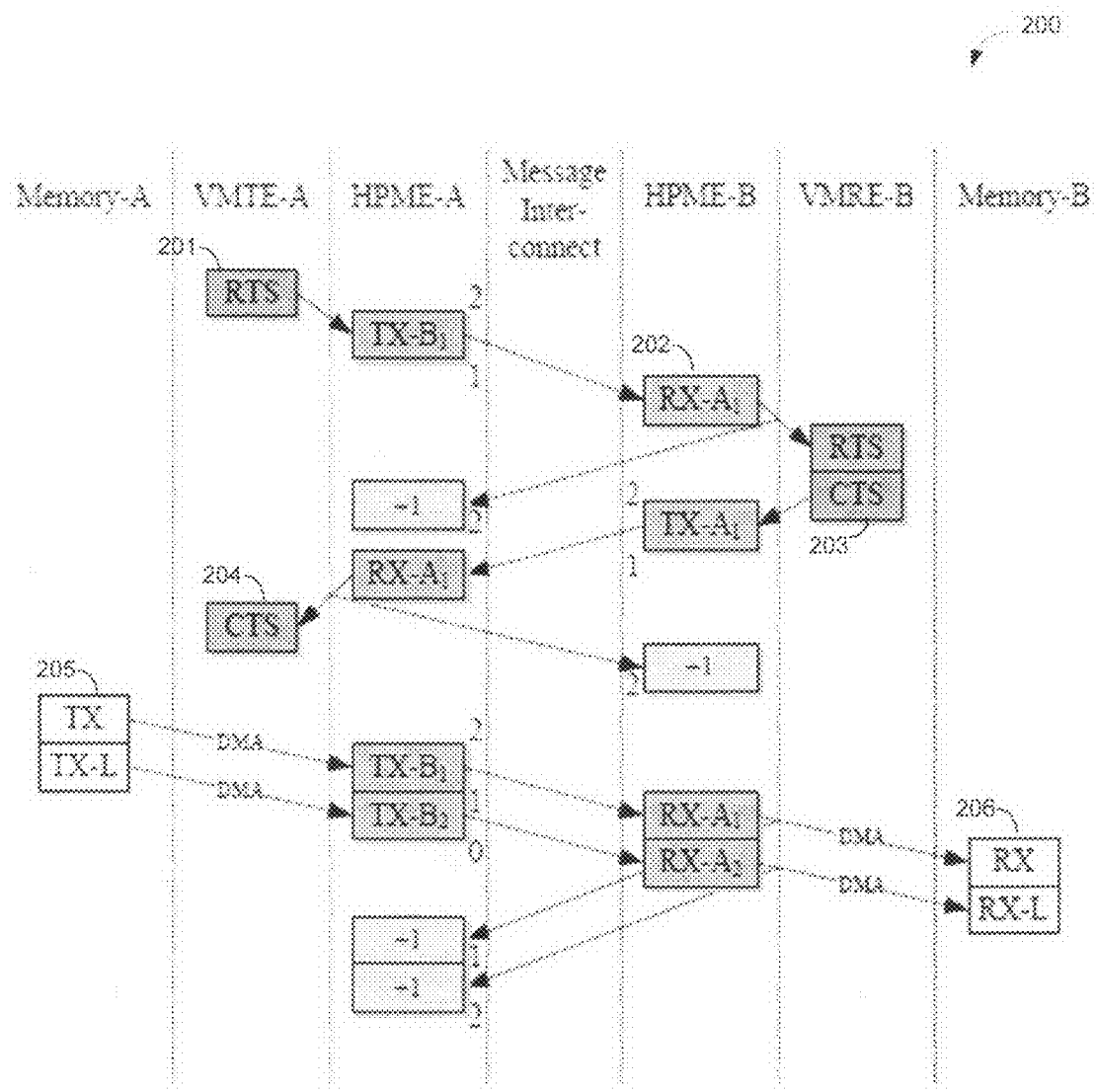
FIG. 2 depicts an example of communications between message engines in accordance with an embodiment.

FIG. 2 depicts an example of communications between message engines in accordance with an embodiment. A virtual message transmitter engine (VMTE-A) is associated with a host physical message engine HPME-A. A hypervisor (not depicted) is responsible for one-time establishment of a connection between sending and receiving message queues. Thereafter, unprivileged software in the address space of the VME may populate the queues with buffers. Once software creates a Send Queue Entry in a Send Queue (SQ), the VMTE may begin the transmit process described in an embodiment in FIG. 2.

At 201, VMTE-A initiates a transfer of message segments to a receiver message engine by transmitting a request to send (RTS) message to the VMRE. An RTS message may have the format described with regard to FIG. 11. In this example, the physical receiving message engine is HPME-B. A virtual receive message engine VMRE-B is associated with HPME-B.

HPME-A may use the following process to transmit an RTS message:

1. Allocate storage for a returning clear to send (CTS) message. This storage may be a portion of the memory occupied by the SQ entry for this message. The transmitter may associate the request ID (RID) value with this CTS storage in order to correctly process a returning CTS message.

2. Initialize the RTS message with the Destination and Source VME Addresses, queue number (QN), message sequence number (MSN), and request ID (RID).

3. Transmit the RTS message.

At 202, HPME-B may perform the following checks on the received messages: 1) the Destination VME Address belongs to a VMRE scheduled on the PME; 2) the QN exists and is less than or equal to the maximum permissible QN for the VMRE; 3) the Source VME Address is permitted to send to the specified QN at the destination VMRE address; 4) the MSN is greater than or equal to the minimum MSN value for the QN; and 5) the MSN is less than or equal the maximum MSN value for the QN. If all validation checks succeed, then HPME-B requests a reassembly slot used to reassemble received message segments.

The process to allocate a reassembly slot may be as follows.

1. Provide the Source VME Address, QN and MSN, RID values to a Reassembly Reservation Station (not depicted).

2. The Reassembly Reservation Station attempts to allocate a reassembly slot. If a slot is available, the Reassembly Reservation Station provides the Reassembly Tag and the RID to the CTS Transmit Handler (not depicted). The Reassembly Reservation Station may store pertinent local information such as the Source VME Address, QN and MSN values in a context associated with the Reassembly Tag.

3. A CTS Transmit Handler prepares the Segmentation and Reassembly Layer to handle inbound data segments associated with the RT.

4. The CTS Transmit Handler constructs and transmits the CTS message. The RID field contains the verbatim value received from the sender in the associated RTS message.

A Segmentation and Reassembly Layer (not depicted) of the sender of a CTS message may be ready to accept incoming data segments for the associated Reassembly Tag immediately upon transmitting the CTS message.

At 203, VMRE-B permits transmission of messages from VMTE-A by initiating transmission of a clear to send (CTS) message through a virtual message transmitter engine (not depicted) associated with HPME-B. The CTS message includes the Reassembly Tag (RT) value used by the VMRE to recognize this message from other in-flight messages.

VMRE-A (not depicted) is associated with HPME-A and is used to process received messages. At 204, VMRE-A (not depicted) recognizes the CTS message from HPME-B. The VMRE-A may use the RID value in the CTS message to identify the associated message.

At 205, VMRE-A marks the message as ready-to-send. If VMTE-A is currently scheduled, then VMTE-A begins transmission of the message depicted here as containing two segments called TX and TX-L from memory region A (memory-A) to memory region B (memory-B) using a data mover. A data receiver such as unprivileged software (not depicted), that is to process contents of the messages, populates a receive queue (RQ) with descriptors that point to buffers in memory. A reassembly layer reads the descriptors, the Reassembly Tag (RT) and Message Segment Offset (MSO) from message segments and informs a data mover to place the segments in a buffer designated memory-B. The descriptors, RT, and MSO identify a destination for segments as memory-B. The reassembly layer may inform VMRE-B when all segments of a message have been placed in memory.

VMTE-A transmits segments observing transmit priority with respect to other in-flight message transmit operations. If VMTE-A is not currently scheduled when VMRE-A marks the message ready-to-send, then transmission of the message may resume after the hypervisor reschedules VMTE-A.

At 206, message segments, TX and TX-L, arrive at memory region B. The message segments include the RT field used by VMRE-B to identify the message context to which the segments belong. This context may include the source and destination virtual message engine addresses, queue number (QN) field, and the message sequence number field (MSN).

The recipient PME locates the VMRE associated with the RT. If the PME cannot locate the receive context, the PME discards the segment. The recipient PME also validates that the MSO specified in the segment is within range for the message being received. If the MSO is not in range, the PME discards the segment.

The VMTE may transmit segments in order, but reordering of segments within a message may occur. At the message destination, a Reassembly Layer (not depicted) may: 1) place segments in memory; 2) may indicate message arrival to the VMRE only when all of the following conditions are met: a) all segments of a message have been placed in memory and b) all segments of all previous messages have been placed in memory; and 3) when indicating message arrival, the Reassembly Layer may indicate to the VMRE whether a message is a control messages or a data message.

The recipient of a message segment may ensure the segment is placed within the correct location in the message, regardless of arrival order. An MSO field in the message makes placement of a segment in the correct location a convenient operation in the VMRE. However, the recipient may ensure that all segments of a message have arrived before indicating that the message is available for processing.

The VMRE interface may make the following assertions.

1) After software posts a receive queue entry (RQE), but before a VMRE indicates a reconstructed message has arrived and is available for processing, the VMRE may manipulate memory within a message data buffer in any manner. Software may not depend on any particular data accessing behavior in the data buffer.

2) VMRE may manipulate memory within the RQE in any arbitrary manner. Software may not depend on any particular data accessing behavior in the RQE.

3) The VMRE may manipulate memory within the RQ Header to increment the head field by 1 or more.

4) After a VMRE indicates a message has arrived, software (e.g., software that processes the received message) can assume that all completed messages are placed in memory as indicated by the Head field of the RQ Header.

Figure 3:
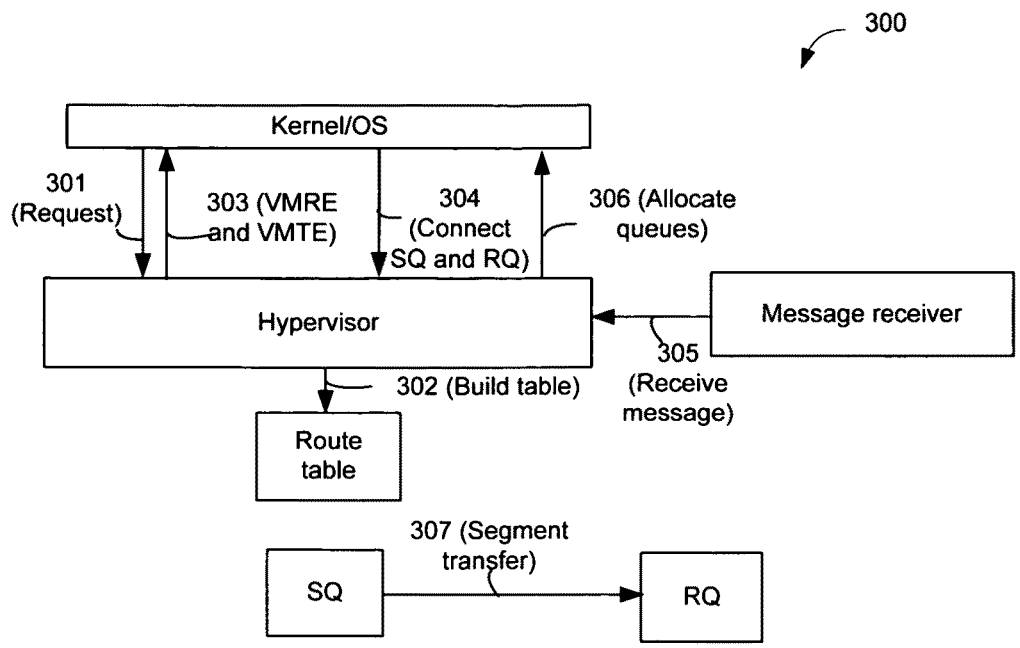
FIG. 3 depicts an example of initialization process for transmissions of message segments from a VMTE to a VMRE in accordance with an embodiment.

FIG. 3 depicts an example initialization process for transmissions of message segments from a VMTE to a VMRE in accordance with an embodiment. At 301, a kernel/operating system (OS) requests a hypervisor for a connection using message engines.

At 302, the hypervisor builds a table with contexts that describe available VMREs. Contexts are accessible by message engines. In some embodiments, suitable contexts are those described with regard to FIG. 6.

At 303, the hypervisor transfers to the kernel the logical addresses of the virtual message receive engine (VMRE) and virtual message transmit engine (VMTE) of a connection. The VMRE and VMTE correspond to addresses that serve as logical interfaces to physical message engines involved in the message engine connection.

At 304, the kernel requests the hypervisor to connect its send queue (SQ) to a remote receive queue (RQ).

At 305, a message receiver that controls receipt of messages indicates readiness to receive messages. The message receiver could be, but is not limited to, application software, kernel, soft-switch, or a fixed function accelerator.

At 306, the hypervisor allocates an SQ, RQ, and completion queue (CQ) and indicates the allocated SQ, RQ, and CQ to the kernel.

Thereafter, a physical transmitter message engine transfers contents of identified in part using the SQ to a location identified in part using the RQ. The RQ may exist in pageable memory. In one embodiment, the transmitting message engine uses a data mover to form message segments from contents of linear addresses, where the linear addresses are identified by the SQ. The transmitting message engine uses the data mover to place message segments into internal buffering pending transmission on the message interconnect. The receiving message engine uses a data mover to place message segments into linear addresses identified by the RQ. Linear addresses are contiguous addresses that are mapped in a CPU's page tables and these linear addresses may natively accessible by software.

A Completion Queue (CQ) allows a VME to notify software of activity, such as receiving or transmitting a message. A CQ may be associated with one or more SQs or one or more RQs. A CQ and its associated RQs or SQs may exist in the same address space as the VME. A CQ may reside in contiguous virtual address space. A CQ may exist in pageable memory and the VME may incur a page fault attempting to read or write the CQ.

Page faults may occur when a VME accesses the virtual buffers used to send and receive messages for a particular queue. A VMTE with a message to send will begin segmenting the message and providing those segments to the PME. The PME will transmit segments to the recipient throttled by link credit and in observation of transmit queue prioritization.

If the VMTE encounters a page fault while reading the message buffer, the VMTE takes the following actions: 1) pushes its current context into a Fault Context Buffer (not depicted) for this SQ; 2) halts transmission of messages from the faulting send queue; 3) interrupts the thread associated with the VME to resolve the fault; and 4) resumes processing all other Send Queues as normal.

For its part, the fault handler thread may take the following actions:

1. Read the fault context buffer and load the faulting page into memory.

2. Write the VME doorbell of the faulting SQ to resume message transmission.

Upon detecting the doorbell, the VME may take the following actions:

1. Continue processing higher priority SQs as normal.

2. After no higher priority SQs have a message to send, the VMTE loads the fault context buffer for the faulting SQ.

3. Resume segmenting the message starting with the first faulting segment.

A VMRE reassembles segments received from the PME by writing those segments to the corresponding message buffer in memory. If the VMRE encounters a page fault while writing a Receive Queue, the VMRE may take the following actions.

1. Push its current context into the Fault Context Buffer for this RQ.

2. Transmit the FAULT message to the sending VMTE. The FAULT message indicates the MSN of the faulting message segment.

3. Interrupt the thread associated with the VMRE to resolve the fault.

4. Discard any further message segments received for this message.

5. Continue to accept and place message segments for other queues (non-page faulting) as normal.

A fault-handler thread may take the following actions:

1. Read the Fault Context Buffer and faulting page into memory.

2. Construct a message to the sender to inform the sender to resume transmission of the faulting message. The contents of this message depend on the specific nature of the VMTE.

Figure 4A:
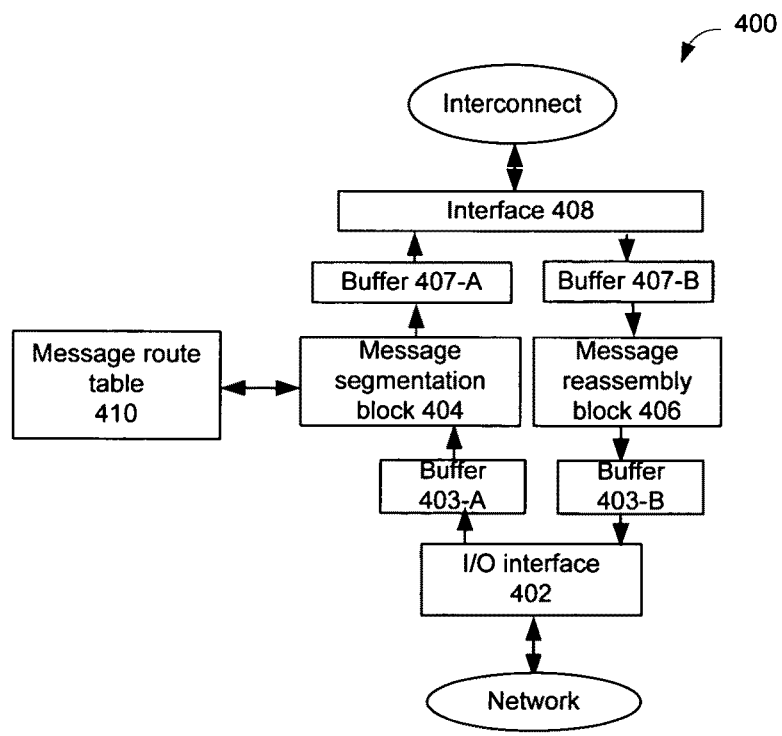
FIG. 4A depicts a simplified block diagram of a message engine in accordance with an embodiment.

FIG. 4A depicts a simplified block diagram of a message engine in accordance with an embodiment. For example, message engine 400 can be used to transmit messages to any other message engine, such as a may be contained within a network interface. Message engine 400 can also be used to receive messages from another message engine. The network interface may be capable of transmitting and receiving network protocol units. As used herein, a "network protocol unit" may include any packet or frame or other format of information with a-header and payload portions formed in accordance with any protocol specification.

I/O interface 402 may perform media access control (MAC), filtering, and cyclic redundancy check (CRC) operations on received Ethernet frames as well as media access control for Ethernet frames to be transmitted. In other embodiments, I/O interface 402 may perform protocol encoding and decoding for frames and packets of other specifications.

Buffer 403-A may store received Ethernet frames processed by I/O interface 402 whereas buffer 403-B may store Ethernet frames that are to be transmitted prior to processing by I/O interface 402.

Message segmentation block 404 is capable of segmenting Ethernet frames from buffer 403-A into messages of a size compatible with an underlying message interconnect. Message segmentation block 404 may query message route table 410 to determine a Virtual Message Receive Engine (VMRE), queue number (QN), and message sequence number (MSN) in which to transfer messages that transport contents of a received Ethernet frame. Message segmentation block 404 may transfer message segments that are to be transmitted into buffer 407-A. Buffer 407-A may be identified using a send queue (SQ). Message segmentation block 404 may transfer message segments from buffer 407-A to the location associated with a VMRE, QN, and MSN using a data mover (not depicted).

Buffer 407-B may store message segments received through an interconnect. Buffer 407-B may be identified in part using a receive queue (RQ). Message reassembly block 406 may transfer message segments to buffer 407-B using a data mover (not depicted).

Message reassembly block 406 is capable of reassembling message segments in buffer 407-B into complete messages and providing the contents in buffer 403-B for transmission in one or more network protocol units.

Interface 408 may transfer messages from message segmentation block 404 to an interconnect and transfer messages from an interconnect to message reassembly block 406.

Figure 4B:
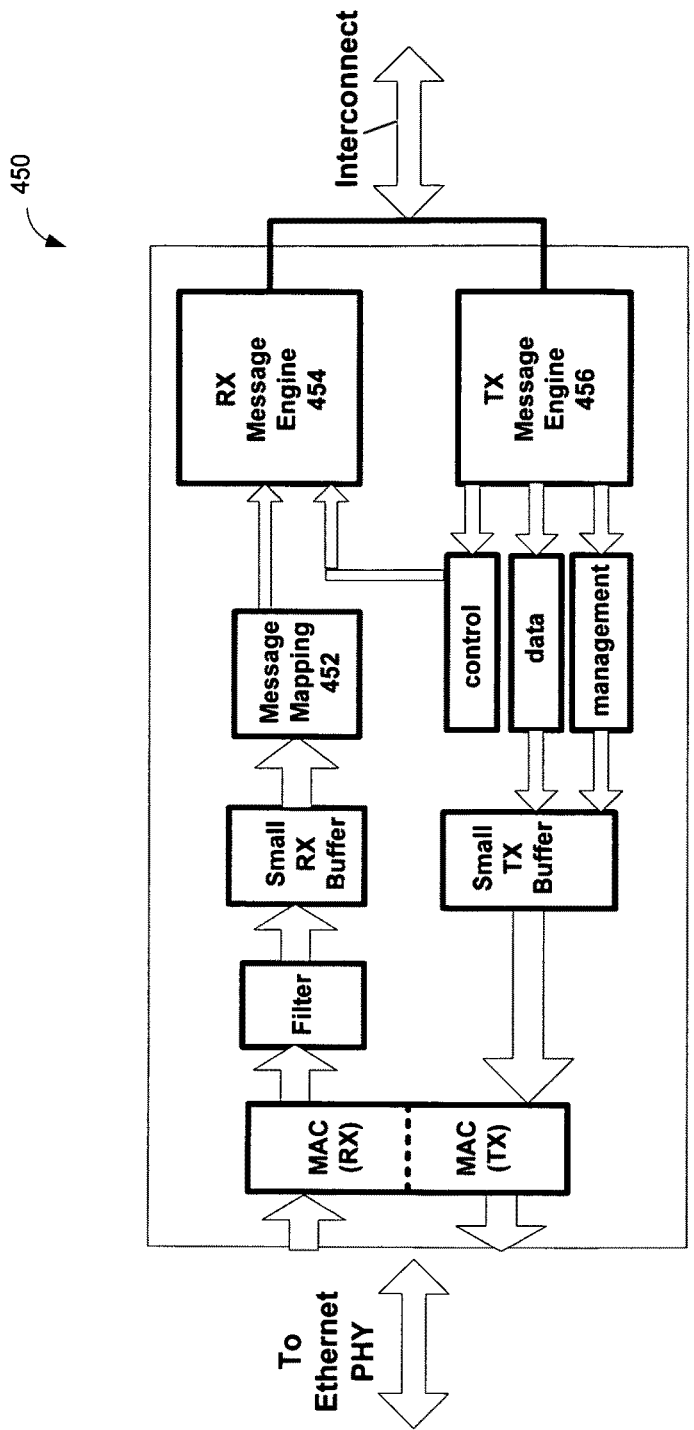
FIG. 4B depicts in block diagram format a network communication system that utilizes message engines to communicate with external devices in accordance with an embodiment.

FIG. 4B depicts in block diagram format a network communication system that utilizes message engines to communicate with external devices in accordance with an embodiment. For example, system 450 may include the capability of an Ethernet compatible network interface that transfers received Ethernet frames using receive (RX) message engine 454. System 450 also uses a transmit (TX) message engine 456 to receive messages that contain data to be transmitted in Ethernet frames or control or management information for the Ethernet network interface. System 450 may encode and decode other types of network protocol units such as but not limited to Serial ATA and Infiniband.

In this example, MAC RX block accepts Ethernet frames from the external Ethernet media PHY. MAC RX block performs framing and Ethernet CRC operations on the raw packets. Filter block discards packets that do not match filter rules. Small receive (RX) buffer block provides buffering to handle message interconnect jitter.

Message mapping block 452 determines an address of a destination message engine and queue for traffic from the small RX buffer. For example, message mapping block 452 may consider the source address, destination address, and/or payload of the Ethernet frame in identifying a destination message engine and queue for the traffic. The destination message engine and queue may be identified based on an identifier of a Virtual Message Receive Engine (VMRE), queue number (QN), and message sequence number (MSN). Multiple destination message engines may be available, where each destination message engine is associated with a core. Message mapping block 452 may distribute contents of Ethernet frames to cores using a distribution scheme similar to receive side scaling (RSS) or application targeting routing, although other schemes can be used. Message mapping block 452 may determine contents of message segment headers (e.g., non-data portion) using a lookup operation.

Receive (RX) message engine 454 may form message segments and transmit the messages using an interconnect to the destination message engine (not depicted). The destination message engine (not depicted) may receive messages for processing by a core, hardware accelerator, or network protocol offload processor (e.g., iSCSI).

Transmit (TX) message engine 456 may receive messages from a source message engine. TX message engine 456 may receive message segments from the on-die interconnect. TX message engine 456 may examine the payload of received messages to determine whether the messages contain control, data, or management content. TX message engine 456 directs control segments to the control block, management segments to the management block, and data segments to the data block.

Messages can be used to transmit control information in lieu of using memory based interaction (e.g., PCI). For example, control information in messages can be used to configure and direct runtime behavior. For example, a control message may set link speed.

The control block implements I/O Bridge control functionality, such as controlling the other functional blocks and the external Ethernet media PHY. The data block may form Ethernet data frames from message segments. Management block may form Ethernet control frames, e.g. PAUSE or other frames from message segments. The control block may exchange control messages with cores or devices elsewhere in the platform. For example, the control block may support control messages that allow configuration of the other blocks in the I/O Bridge.

Small transmit (TX) Buffer block provides buffering to handle message interconnect jitter. MAC transmit (TX) block performs framing and CRC operations before transmitting the packet to an Ethernet media PHY.

In some embodiments, system 450 provides less dedicated silicon in the platform than a traditional discrete network interface. In some embodiment, system 450 provides a lean path between an Ethernet wire and a core and eliminates latency compared to a traditional network interface performing direct memory accesses (DMA). In some embodiments, software can implement OSI Layer 2 features instead of fixed silicon gates in a traditional network interface. In some embodiments, unlike a traditional network interface with DMA, system 450 does not require shared coherent memory with the cores that process the packets.

Figure 5:
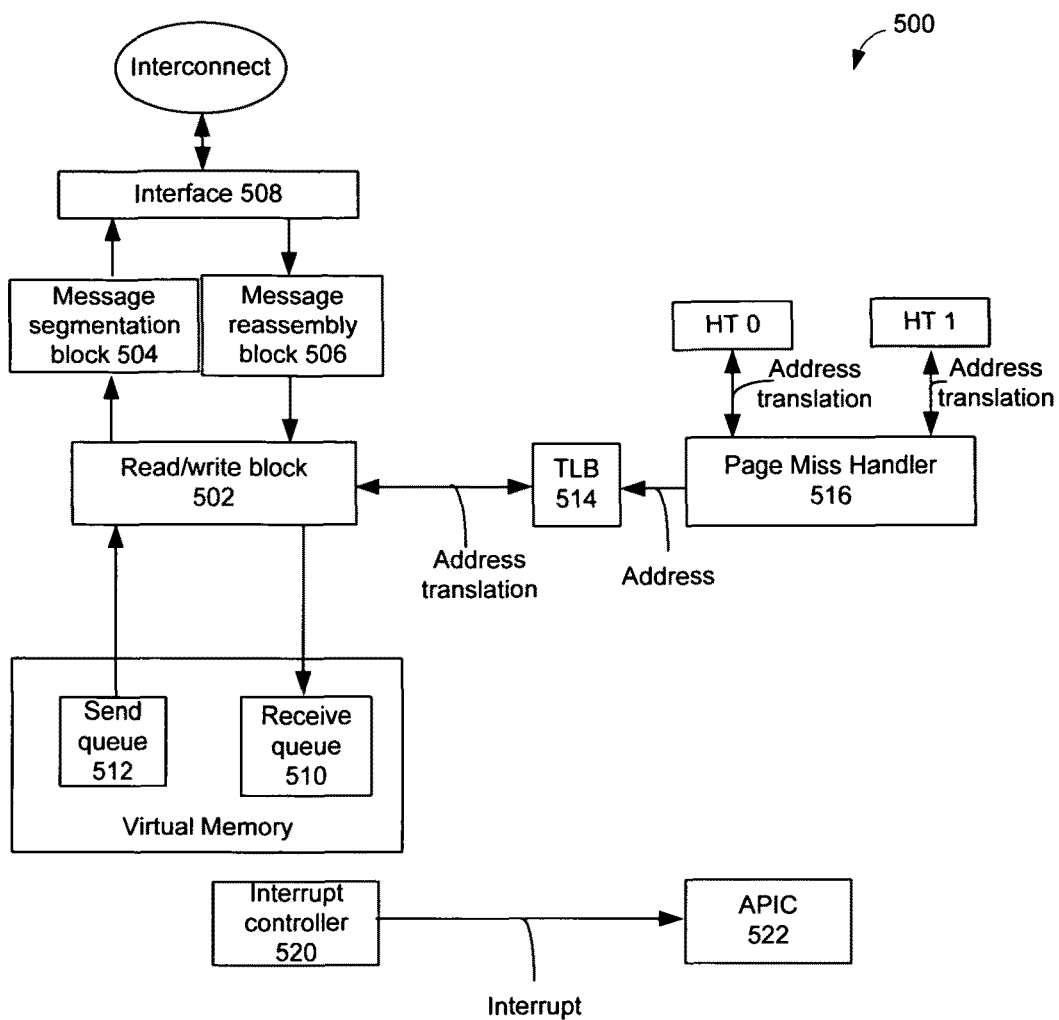
FIG. 5 depicts a high level block diagram of a message engine in accordance with an embodiment.

FIG. 5 depicts a high level block diagram of a message engine in accordance with an embodiment. Message engine 500 provides transmission of message segments at the request of a processor, core, or hardware thread as well as receipt of message segments for processing by a processor, core, or hardware thread.

For message transmission, message segmentation block 504 may segment messages identified using a send queue 512 for transmission through an interconnect. Although not depicted, message segmentation block 504 may use a data mover to transfer message segments identified using a send queue 512 to a location identified using a receive queue (not depicted). Accordingly, memory to memory transfers are made using contents of one local SQ and one local RQ and message engines may not interact directly with the queues of another message engine.

For message segments received from the interconnect, message reassembly block 506 may reassemble messages and store the messages into receive queue 510. Although not depicted, message reassembly block 506 may use a data mover to transfer message segments from a send queue associated with another message engine (both not depicted) into a location identified using receive queue 510.

Read/write block 502 permits reading of messages for transfer from a location identified using send queue 512 in virtual memory using virtual-to-physical address translation provided from Translation Lookaside Buffer (TLB) 514. Read/write block 502 permits writing of messages to a location identified using receive queue 510 in virtual memory using virtual-to-physical address translation provided from Translation Lookaside Buffer (TLB) 514. In one embodiment, read/write block 502 is capable of writing message segments to coherent memory and reading message segments from coherent memory in the same manner as hardware threads. Read/write block 502 may share a cache hierarchy and memory management unit (MMU) with hardware threads in a core.

Translation Lookaside Buffer (TLB) 514 and page miss handler (PMH) 516 provide memory management unit (MMU) capabilities. In response to virtual addresses provided by read/write block 502, TLB 514 converts virtual addresses to physical addresses. Hyperthread HT0 or HT1 may perform address translation of entries in PMH 516. If no entry is available in TLB 514, PMH 516 retrieves the addresses from a page table address and stores the addresses in TLB 514. The PMH 516 may be shared with hardware threads associated with a core. The PMH 516 may also be dedicated for use by one or more message engines.

Interface 508 may provide a physical layer interface between the interconnect and message segmentation block 504 and message reassembly block 506.

Figure 6:
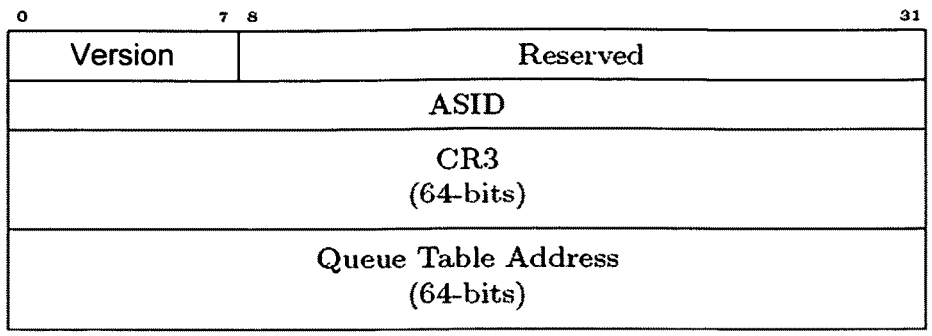
FIG. 6 depicts an example format for a context to define an available VMRE in accordance with an embodiment.

FIG. 6 depicts an example format for a context to define an available virtual message receive engine (VMRE) in accordance with an embodiment. Field Version (bits 7-0) indicates a version of the protocol. Field ASID specifies the Application Space Identifier used by the translation lookaside buffer (TLB) for virtual to physical address translations. Field CR3 specifies the page table address used by a page miss handler for virtual to physical address translations. Field Queue Table Address specifies the pageable memory address of the array of queues supported by this VMRE.

A Physical Message Engine (PME) provides virtualized interfaces to hardware threads using Virtual Message Engines (VMEs) at least to send and receive messages. The PME also provides a physical interface to hardware threads for the purpose of control and configuration of message engine hardware. The physical interface to the PME may not perform virtual memory translation. Rather, the physical interface of the PME may interact with pinned memory in host physical address space. The physical interface of the PME may also interact with registers in a core.

A Virtual Message Engine (VME) may perform memory translations using MMU page tables and interact with virtual memory. As with a software thread, a VME accesses memory in association with an ASID and CR3 pointer to the top of a page table structure. The VME may share ASID and CR3 values with the software threads associated with an address space, though this is not required. System software may treat the VME as a thread within the address space identified by the ASID. For example, system software may keep the page tables utilized by the VME in a consistent state so long as a VMTE or VMRE may send or receive a message. Standard TLB shoot-down rules may apply as with software threads.

Figure 7:
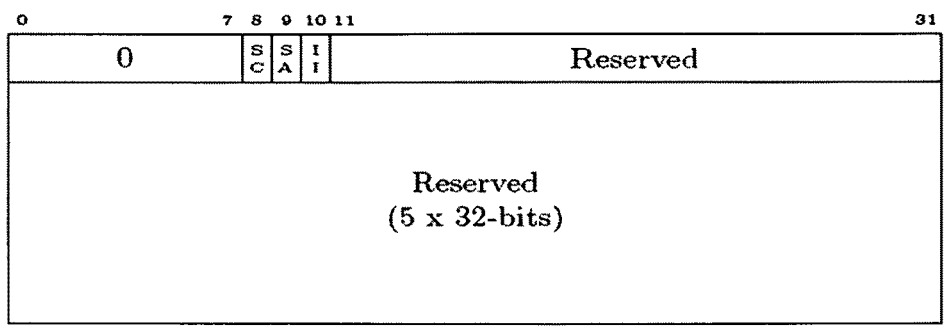
FIG. 7 depicts an example format for a no-operation command in a send queue in accordance with an embodiment.

FIG. 7 depicts an example format for a no-operation command in a send queue in accordance with an embodiment. A send queue (SQ) entry directs the VMTE to perform a null operation that does not send a message. Field Command (bits 7-0) is 0 for a No-op command. Field Immediate Interrupt (II), when set, directs the VME to generate a CQ interrupt immediately, regardless of the interrupt moderation interval.

Figure 8:
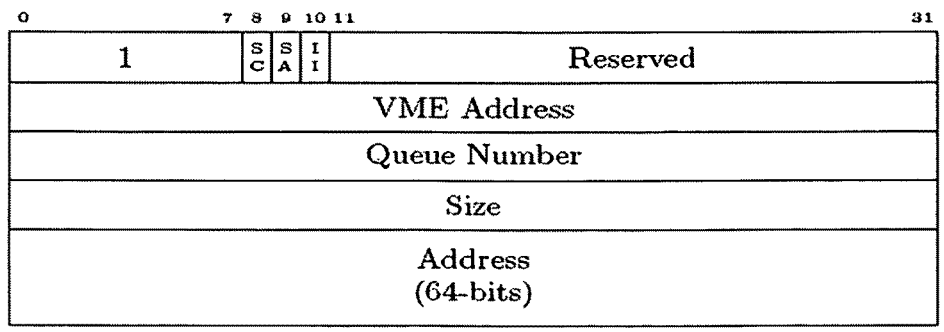
FIG. 8 depicts an example format for a command in a send queue in accordance with an embodiment.

FIG. 8 depicts an example format for a command in a send queue in accordance with an embodiment. This command commands a VMTE to transmit a message. Field Command (bits 7-0) is 1 for a Send command. Field Immediate Interrupt (II), when set, directs the VME to generate a CQ interrupt immediately, regardless of the interrupt moderation interval. Field VME Address specifies the destination VMRE for the message. Field Queue Number specifies the destination queue number for this message. Field size specifies the number of bytes in contiguous virtual memory to transmit. Field address specifies the virtual address in cacheable pageable memory of the data to transmit.

Figure 9:
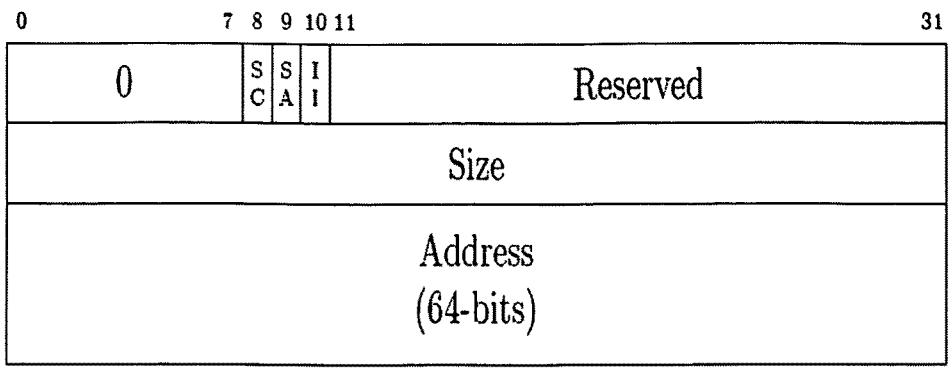
FIG. 9 depicts an example receive queue format in accordance with an embodiment.

FIG. 9 depicts an example entry in a receive queue in accordance with an embodiment. Field Command (bits 7-0) is 0 for a Receive command. Field Immediate Interrupt (II), when set, directs the VME to generate a Co interrupt immediately, regardless of the interrupt moderation interval. Field Size specifies the number of bytes in contiguous virtual memory of the receive buffer. Upon completion of the message receive operation for this descriptor, the VMRE updates the Size field to contain the actual number of message segments received. Field Address specifies the virtual address in cacheable pageable memory of the receive buffer.

Figure 10:
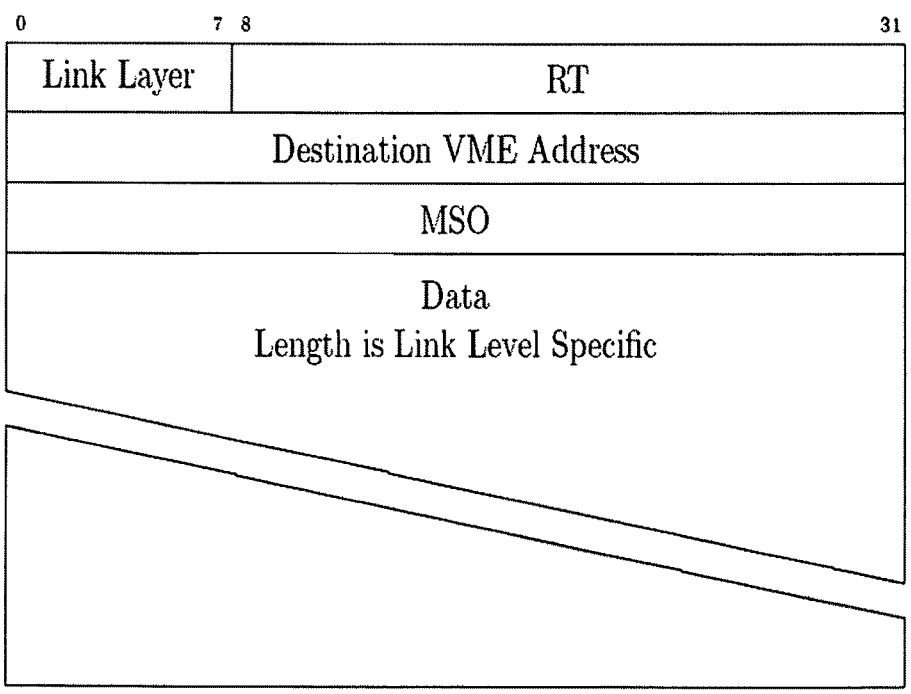
FIG. 10 depicts an example message segment format in accordance with an embodiment.

FIG. 10 depicts an example message segment format in accordance with an embodiment. Field RT specifies the Reassembly Tag returned in the CTS Messages. Field Destination VME Address specifies the destination VMRE for the segment. Field MSO specifies the Message Segment Offset of the segment. The MSO contains the position of this segment relative to the start of the message. The first segment of the entire message is numbered 0. The data portion of the segment contains the data payload of this segment. The length of the payload is Link Level specific. Although not depicted, the message segment format may also include a last field to indicate that a segment is the last segment of a message.

Figure 11:
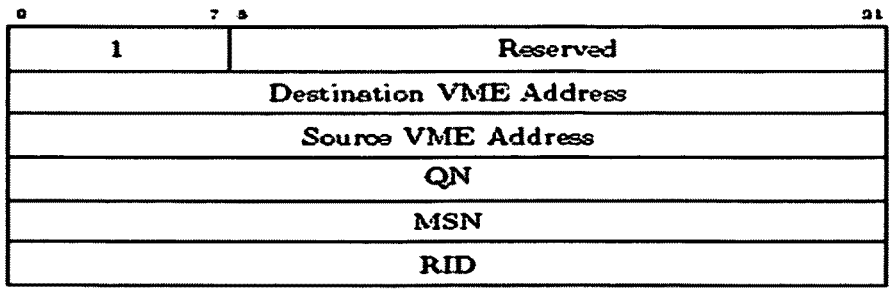
FIG. 11 depicts an example request to send (RTS) message format in accordance with an embodiment.

FIG. 11 depicts an example request to send (RTS) message format in accordance with an embodiment. Field Command is set to 1 for the RTS Message. Field Destination VME Address specifies the destination VMRE for the message. Field Source VME Address specifies the source VMTE of the message. Field QN specifies the destination Queue Number within the specified Address Space Identifier. Field MSN specifies the Message Sequence Number within the specified Queue Number. Field RID specifies the Request ID that the recipient may return verbatim in the CTS Message associated with this request.

A maximum message size may be smaller than the jumbo frame size. In an embodiment, a single RTS message can be transmitted for several adjacent messages which belong to the same connection, where the adjacent messages are used to transmit a jumbo frame. A field for "Number of Message" could be added in the RTS message to identify the message number associated with a single RTS message and a jumbo frame. For example, part of the current Reserved field in FIG. 11 can include the Number of Message field. In addition, in FIG. 10, a small portion of the MSO field could be used to identify the Number of Message within one RTS or RT.

Figure 12:
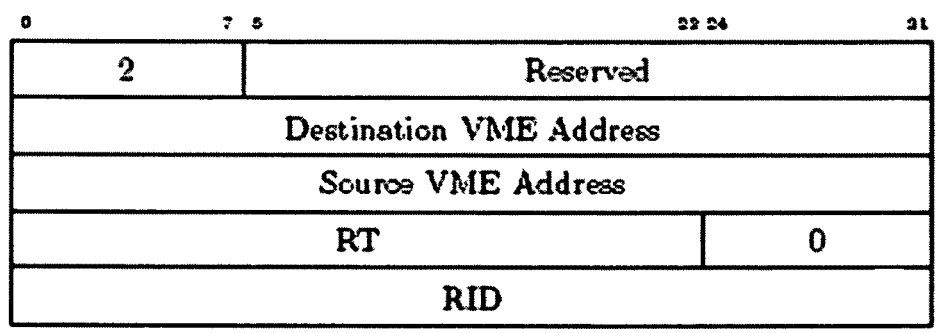
FIG. 12 depicts an example clear to send (CTS) message format in accordance with an embodiment.

FIG. 12 depicts an example clear to send (CTS) message format in accordance with an embodiment. Command field may be set to 2 for the CTS Message. Field Destination VME Address specifies the destination VMRE for the message. Field Source VME Address specifies the source VMTE of the message. Field RT specifies the Reassembly Tag. For subsequent message segments, the VMTE places this value in the RT field of every segment of the message. The upper byte of the RT value is set to 0. RID field specifies the Request ID supplied by the VMTE in the RTS message. Field RID allows the VMTE to correlate CTS messages with outstanding RTS messages.

Figure 13A:
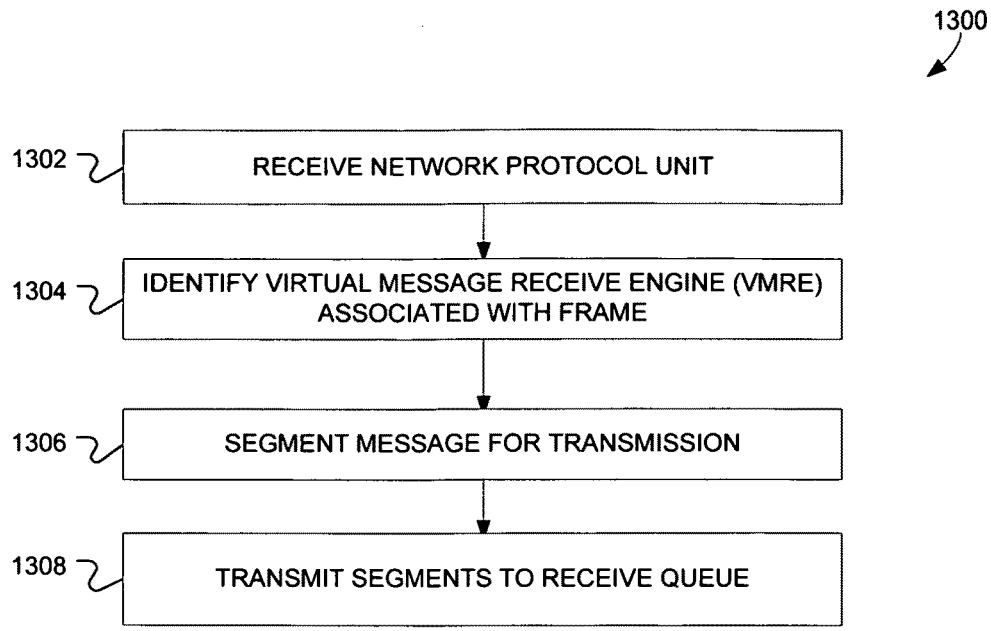
FIG. 13A depicts an example flow diagram of a process to transfer messages from an IO device using a message engine in accordance with an embodiment.

FIG. 13A depicts an example flow diagram of a process 1300 to transfer messages from an IO device using a message engine in accordance with an embodiment. Block 1302 may include receiving a network protocol unit from a network. For example, block 1302 may include receiving an Ethernet frame.

Block 1304 may include identifying a virtual message receive engine (VMRE) and destination queue associated with the received frame. The VMRE may be associated with a message engine that is to receive messages for processing by a core. The VMRE and destination queue (QN) may be identified as described with regard to FIG. 2.

Block 1306 may include segmenting a message for transmission to the VMRE. A virtual message transmit engine (VMTE) may segment the message. A format for message segments may be as described with regard to FIG. 10.

Block 1308 may include transmitting each segment to a destination location. The destination location in virtual memory may be identified by logic that is to process each received segment based in part on descriptors in a receive queue, the Reassembly Tag (RT) and Message Segment Offset (MSO) from the segments.

Figure 13B:
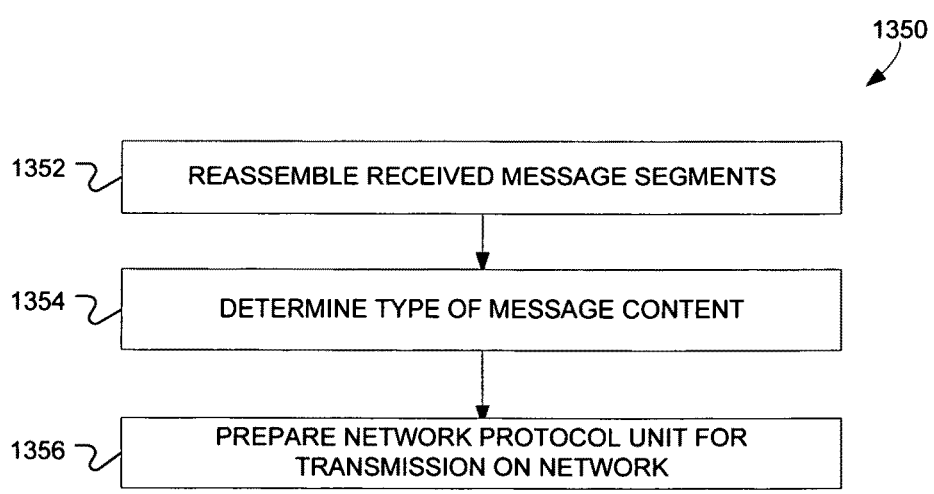
FIG. 13B depicts an example flow diagrams of a process to receive messages using a message engine at an IO device in accordance with an embodiment.

FIG. 13B depicts an example flow diagrams of a process 1350 to receive messages using a message engine at an IO device in accordance with an embodiment.

Block 1352 may include reassembling received message segments into complete messages. Messages may be received out of order. A Message Segment Offset (MSO) field in the message may be used to properly order the segments into a message.

Block 1354 may include determining the type of message content. For example, content can be control, data, or management.

Block 1356 may include preparing a network protocol unit with data or control content for transmission. For example, block 1356 may include preparing an Ethernet frame with data or control content for transmission.

Figure 14:
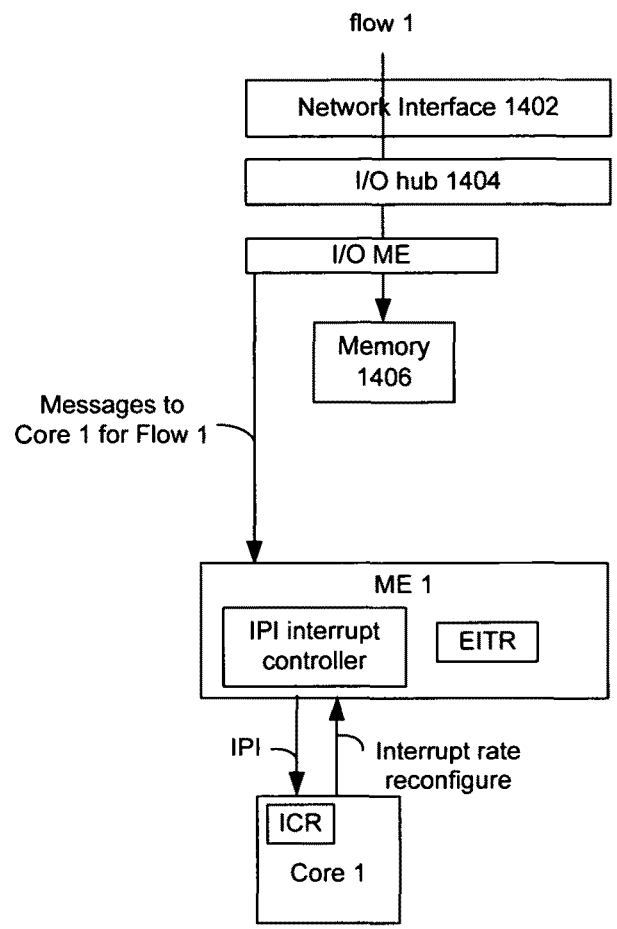
FIG. 14 depicts in block diagram format an example in which a message engine uses inter-processor interrupts (IPI) to interrupt a core, in accordance with an embodiment.

FIG. 14 depicts in block diagram format an example in which a message engine uses inter-processor interrupts (IPI) to interrupt a core. This example depicts the use of an IPI to inform a core (Core 1) to process incoming traffic (flow 1). Flow 1 arrives at a network interface 1402 and is transferred to memory 1406. The transfer may take place using a direct memory access engine (not depicted) and via an input/output (I/O) hub 1404. Core 1 is assigned to process flow 1. Message engine ME1 is associated with core 1 and a message engine associated with the network interface hub (shown as I/O ME) transmits data from network interface 1402 to message engine ME1 in the form of messages. Based on how Core 1 has configured message engine ME1, ME1 will decide when to interrupt Core 1 to inform Core 1 that flow 1 is available for processing.

In an embodiment, ME1 communicates the interrupt to core 1 via an inter-processor interrupt (IPI). Many central processing units (CPUs) have an interrupt command register (ICR). Message engine ME1 may trigger an IPI by writing to the ICR associated with a core to inform the core of the event. ME1 may generate IPIs at a rate set by an Extended Interrupt Throttle Register (EITR). EITR is a programmable register that specifies a rate of interrupts by ME1 to core 1. The EITR may be programmed by system software such as an operating system or driver. The rate of interrupts can be set to a low or high value depending on how much I/O traffic a core is already processing. The rate of interrupts can be set to a higher value if the core is processing a lower rate of I/O traffic. Conversely, the rate of interrupts can be set to a lower value if the core is processing a higher rate of I/O traffic.

Core 1 responds to the IPI by processing the I/O traffic and provides feedback to ME1 of future rate of interrupt by programming the interrupt rate in the EITR. Message engine ME1 uses the updated configuration to interrupt Core 1 for new messages at the specified rate.

Traditional network interface registers are not in the coherent domain because it may lead to high overhead on the memory management unit (MMU) to maintain coherency (i.e., send snoops and wait for responses) as well as because of bus traffic and delays. Uncoherent (UC) write instructions cannot be bypassed by other instructions and the network interface accessing the CPU takes a long time because there are multiple buses and bus controllers in between the network interface and CPU. In an embodiment, EITR is in the coherent domain and Core 1 can write to the EITR like any other memory address. Accordingly, Core 1 may access the EITR of ME1 much faster than other network interface registers that are not in the coherent domain.

The example of FIG. 14 can be extended to multiple cores, where each core uses an associated message engine to communicate with network interface 1402. For example, a second traffic flow may be associated with a second core, core 2 (not depicted). Each core can separately decide the rate of interrupts based on a data rate of I/O traffic the core receives from I/O device. A separate EITR in ME1 for each core or hyperthread may be used to allow interrupt rate control for each core or hyperthread.

Figure 15:
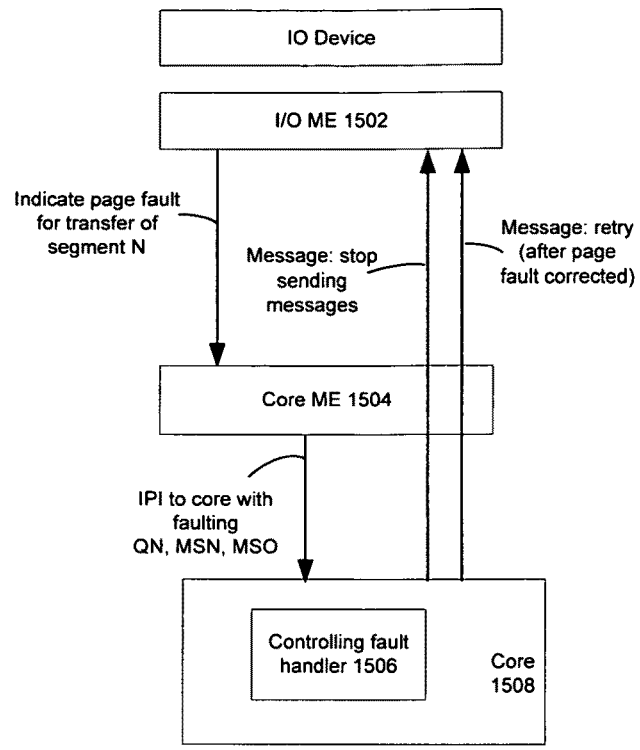
FIG. 15 depicts an example in which a message engine interrupts a core to request processing of a page fault, in accordance with an embodiment.

FIG. 15 depicts an example in which a message engine interrupts a core to request processing of a page fault, in accordance with an embodiment. In this example, transfer of a segment N to memory incurs a page fault. At the time the I/O ME 1502 tries virtual to physical memory translation for a transfer to memory, I/O ME 1502 may detect a page fault. A page fault may occur when the I/O ME 1502 attempts to access a page that is mapped in address space, but not loaded in physical memory. I/O message engine 1502 may transmit a message to notify the message engine associated with core 1508 (shown as core ME 1504) of the page fault for the transfer of segment N. Core ME 1504 may issue an IPI to indicate a queue number (QN), message sequence number (MSN), and message segment offset (MSO) that are associated with the page fault. A controlling fault handler 1506 for a virtual memory layer associated with core 1508 may process the IPI. If the page fault is in user virtual memory, then a kernel fault handler may be invoked. However, if the page fault is in guest physical memory, then the hypervisor may be invoked to remedy the page fault.

Core 1508 may issue commands to the IO device via core ME 1504. For example, core 1508 may request transmission of commands using messages from core ME 1504 to I/O ME 1502 to request I/O ME 1502 to stop transmitting messages that would also trigger a page fault. After a page fault is corrected, core 1508 may transmit messages via core ME 1504 to I/O ME 1502 to request message re-transmission.

Figure 16:
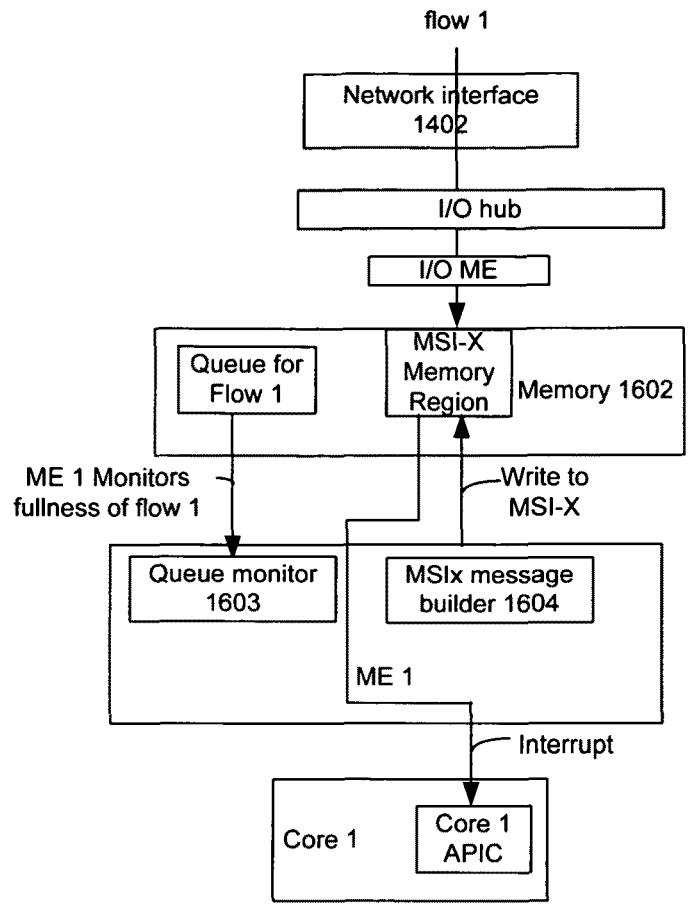
FIG. 16 depicts in block diagram format an example in which a message engine uses MSI-X interrupts to interrupt a core, in accordance with an embodiment.

FIG. 16 depicts in block diagram format an example in which a message engine uses MSI-X interrupts to interrupt a core, in accordance with an embodiment. In this example, core 1 is assigned to process incoming network traffic from network interface 1402, which is identified as flow 1. Message engine ME1 is assigned to core 1. Flow 1 is transferred into memory 1602 in a similar manner as that of flow 1 of FIG. 14. In this embodiment, message engine ME1 includes an MSIx message builder 1604 that is capable of generating a message signaled interrupts (MSI) or MSI-X type interrupts. MSI-X is described in the PCI Express Base Specification 1.0a (2003). Queue monitor 1603 of message engine ME1 monitors the fullness of the queue assigned to store flow 1. When the queue is underflown, ME1 interrupts core 1 by writing to the MSI-X memory region and requests processing of I/O traffic. Core 1 uses a programmable interrupt controller (APIC) to monitor changes to the MSI-X memory. Core 1 responds to interrupts generated by the MSI-X mechanism.

Figure 17:
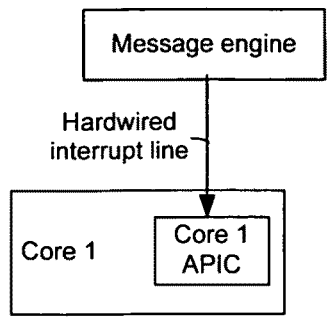
FIG. 17 depicts an example in which a message engine ME interrupts a core using a dedicated, hardwired interrupt line, in accordance with an embodiment.

FIG. 17 depicts an example in which a message engine ME interrupts a core using a dedicated, hardwired interrupt line (shown as INT-A), in accordance with an embodiment. Interrupt line INT-A may be implemented in a similar manner as interrupt lines in Industry Standard Architecture (ISA) buses.

Figure 18:
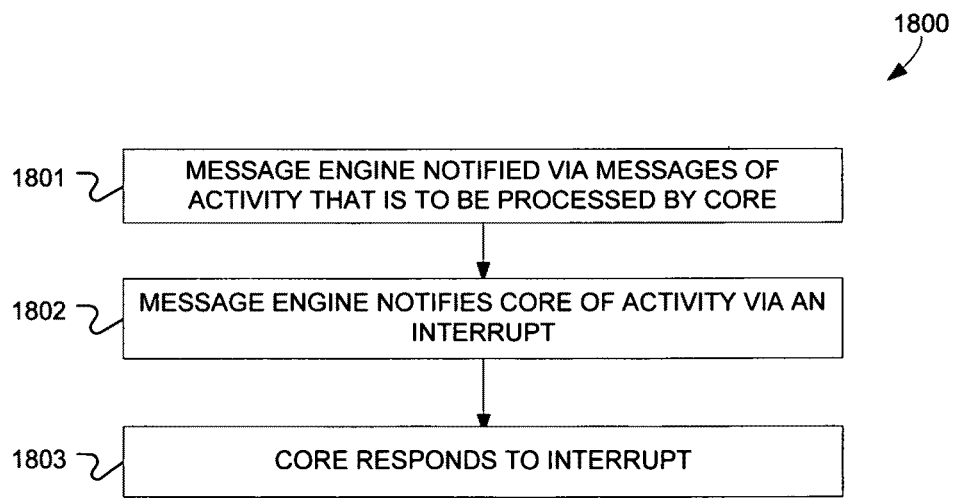
FIG. 18 depicts a process that can be used by a message engine to interrupt a core, in accordance with an embodiment.

FIG. 18 depicts a process 1800 that can be used by a message engine to interrupt a core, in accordance with an embodiment. Block 1801 may include a message engine being notified via messages of activity that is to be processed by a core. For example, the interrupt may notify the core that network traffic is available for processing. For example, the interrupt may notify the core to correct a page fault.

Block 1802 may include the message engine informing the core of the activity via an interrupt. The interrupt may be made via an IPI, MSI, MSI-X, or dedicated hardwired interrupt line. A rate at which the message engine may interrupt the core can be specified by the core by writing to a register in the coherent memory domain.

Block 1803 may include the core responding to the interrupt. For example, the core may respond by processing received network traffic or remedying a page fault. Although, a variety of other tasks may be performed by the core.

What is claimed is:
1. A method comprising:
receiving contents of a network protocol unit from one or more message segments at a buffer identified by a queue associated with a virtual message receive engine, wherein the virtual message receive engine is associated with a message engine and wherein identification of a memory address of the buffer comprises identification of a virtual message engine address of the message engine and is independent of identifying a destination memory address of the buffer, wherein at least one of the message segments comprises:
a destination virtual message engine address;
a reassembly tag field; and
a message segment offset field, wherein
the queue is based at least in part on the reassembly tag field,
the buffer is located based at least in part on the reassembly tag field, and
a location in the buffer to store at least one of the message segments is based at least in part on the message segment offset field; and
indicating availability of contents of the buffer to a core using an interrupt.

2. The method of claim 1, wherein the indicating availability of contents of the buffer from the message engine to a core using an interrupt comprises generating an inter-processor interrupt.

3. The method of claim 1, wherein the indicating availability of contents of the buffer from the message engine to a core using an interrupt comprises writing an MSI-X message in an MSI-X memory region.

4. The method of claim 1, further comprising:
the core programming a rate at which the message engine can interrupt the core.

5. The method of claim 4, wherein the core programming a rate comprises the core writing to a register in a coherent memory domain.

6. The method of claim 1, wherein the network protocol unit is Ethernet compliant.

7. The method of claim 1, wherein at least one of the message segments comprises:
a link layer; and
a data portion.

8. The method of claim 1, further comprising:
receiving an indication of a page fault in response to attempting to write contents of the one or more message segments to the buffer; and
indicating the page fault to the core using a second interrupt.

9. The method of claim 1, further comprising:
receiving a second network protocol unit;
transmitting contents of the second network protocol unit using one or more message segments to a second buffer associated with a second message engine; and
indicating availability of contents of the second buffer to a second core using a second interrupt.

10. An apparatus comprising:
a memory configured to store a buffer to receive contents of a network protocol unit from one or more message segments;
a core; and
a message engine to indicate availability of the contents of the buffer to the core using an interrupt, wherein the message engine is configured to associate with a virtual message receive engine and wherein identification of a memory address of the buffer includes identification of a virtual message engine address of the virtual message receive engine and is independent of identification of a destination memory address of the buffer, wherein at least one of the message segments comprises:
a destination virtual message engine address;
a reassembly tag field; and
a message segment offset field, wherein
a queue is based at least in part on the reassembly tag field,
the buffer is identified using the queue and is located based at least in part on the reassembly tag field, and
a location in the buffer to store at least one of the message segments is based at least in part on the message segment offset field.

11. The apparatus of claim 10, wherein to indicate availability of contents of the buffer from the message engine to the core, the message engine is to generate an inter-processor interrupt.

12. The apparatus of claim 10, wherein to indicate availability of contents of the buffer from the message engine to the core, the message engine is to write an MSI-X message in an MSI-X memory region.

13. The apparatus of claim 10, wherein the core is to program a rate at which the message engine is permitted to interrupt the core.

14. The apparatus of claim 13, wherein to program a rate at which the message engine is permitted to interrupt the core, the core is to write to a register in a coherent memory domain.

15. The apparatus of claim 10, wherein at least one of the message segments comprises:
a link layer; and
a data portion.

16. The apparatus of claim 10, further comprising:
a second buffer, wherein:
in response to receipt of an indication of a page fault in response to an attempt to write contents of the one or more message segments to the second buffer, the message engine is to indicate the page fault to the core using an interrupt.

17. The apparatus of claim 10, further comprising:
a second buffer to receive contents of a network protocol unit from one or more message segments, wherein to indicate availability of contents of the second buffer to the core, the message engine is to generate one or more of an inter-processor interrupt and an MSI-X message.

18. The apparatus of claim 10, wherein the core is to regulate the rate at which the core is to receive interrupts.

19. A system comprising:
a storage device;
at least one core;
a network interface to receive a network protocol unit; and
first and second message engines, wherein
the first message engine is to form at least one message from contents of the network protocol unit and to transmit the at least one message to a buffer accessible to the second message engine, wherein a virtual message receive engine is configured to associate with the second message engine and wherein to transmit to the buffer, the first message engine is to identify a memory address of the buffer using a virtual message engine address of the virtual message receive engine independent of identification of the destination memory address of the buffer, wherein at least one message comprises:
a destination virtual message engine address;
a reassembly tag field; and
a message segment offset field, wherein
a queue is based at least in part on the reassembly tag field,
the buffer is identified using the queue and is located based at least in part on the reassembly tag field, and
a location in the buffer to store at least one of the message segments is based at least in part on the message segment offset field, and the second message engine is to notify one of the at least one core of availability of the message using an interrupt.

20. The system of claim 19, wherein to notify one of the at least one core of availability of the message using an interrupt, the second message engine is to generate one or more of an inter-processor interrupt and an MSI-X message.

21. The system of claim 19, wherein at least one core is to program a rate at which the second message engine is to generate interrupts.

22. The system of claim 19, wherein the first message engine comprises:
  a message mapper to determine a destination virtual message receive engine associated with the network protocol unit; and
  logic to transmit content of the network protocol unit using at least one message to a buffer associated with the destination virtual message receive engine.

23. The system of claim 19, wherein the first message engine is to form at least one segment from the at least one message.

24. The system of claim 19, wherein at least one message further comprises:
  a link layer and
  a data portion.

25. The method of claim 8, wherein the second interrupt comprises one or more of an inter-processor interrupt and an MSI-X message.

* * * * *